United States Patent [19]

Shapcott

[11] Patent Number: 5,332,381
[45] Date of Patent: Jul. 26, 1994

[54] TWO PIECE CROWN LINER PUNCH

[75] Inventor: Michael Shapcott, Hometown, Pa.

[73] Assignee: ZapatA Technologies, Inc., Hazleton, Pa.

[21] Appl. No.: 20,962

[22] Filed: Feb. 22, 1993

[51] Int. Cl.5 ............................................. B29C 63/00
[52] U.S. Cl. ................................... 425/127; 264/268; 425/128; 425/809
[58] Field of Search ..................... 264/268; 413/58, 60; 425/110, 127, 128, 420, 809, 812

[56] References Cited

U.S. PATENT DOCUMENTS

| | | |
|---|---|---|
| 2,840,858 | 7/1958 | Rainer et al. . |
| 2,963,738 | 12/1960 | Brandes et al. ................... 425/809 |
| 3,135,019 | 6/1964 | Aichele . |
| 3,493,453 | 2/1970 | Ceresa et al. . |
| 3,493,995 | 2/1970 | Green ................................ 425/809 |
| 3,564,602 | 2/1971 | Peck . |
| 3,616,954 | 11/1971 | Peck . |
| 3,637,103 | 1/1972 | Ptak . |
| 3,958,910 | 5/1976 | Wilde ................................ 425/809 |
| 3,959,061 | 5/1976 | Renck et al. . |
| 4,088,730 | 5/1978 | Wilde . |
| 4,260,483 | 4/1981 | Nicholson et al. ................ 425/809 |
| 4,274,822 | 6/1981 | Tamai et al. . |
| 4,312,824 | 1/1982 | Mori et al. ........................ 425/809 |
| 4,388,058 | 6/1983 | Kubo ................................. 425/809 |

Primary Examiner—Charles S. Bushey
Attorney, Agent, or Firm—Pennie & Edmonds

[57] ABSTRACT

An apparatus for forming liners of thermoplastic material within closure shells contains a movable die having an inner punch member and an annular outer mold member both of which are movable up and down in relatively slidable relation with each other and arranged so that the inner punch takes its lowermost position after the outer mold member has taken its lowermost position. In one embodiment of the present invention, the lower end surface of the outer mold member is beveled and defines a plurality of radial grooves. The lower end wall of the outer mold member is moved downwardly until it is opposite the horizontal wall of the closure shell. As the inner punch moves into its lowermost position, thermoplastic material is forced through the radial grooves so that a thick annular pad portion of the seal liner is formed beneath the lower end wall of the outer mold member.

16 Claims, 4 Drawing Sheets

TWO PIECE CROWN LINER PUNCH

FIELD OF THE INVENTION

This invention relates to a molding device for shaping a liner material on the inside of the top panel of a closure shell into a predetermined shape.

DESCRIPTION OF THE PRIOR ART

Container closures of the type comprising a top panel, a closure shell having a skirt extending downwardly from the peripheral edge of the top panel, and a liner of a plastic material such as a poly vinyl chloride resin disposed on the inside of the top panel of the shell are known. Such closures have heretofore gained widespread acceptance as container closures for sealing the open portions of containers such as bottles and cans and include crown caps, pilferage-proof caps, screw caps and easily openable container closures of various forms. Generally the liner in such closures is formed conveniently by supplying a heat-molten liner material such as plastisol to the inside of the top panel of a closure shell and molding it into a desired shape. A known conventional device for molding a liner material to the inside of a top panel of a closure shell into a desired shape comprises an anvil on which is placed an inverted closure shell having a liner material supplied to the inside of its top panel. A molding tool is disposed above the anvil, and an elevator mechanism is included for elevating or lowering either of the molding tool or the anvil relative to the other. A problem with this type of molding device, such as the type shown for example in U.S. Pat. No. 3,135,019, is that the liner material cannot always be accurately molded into a liner of the desired shape. A molding tool used in a known molding device generally includes a main body, a center punch secured to the lower end portion of the main body, an annular bushing positioned externally of the center punch and an annular position setting sleeve positioned externally of the annular bushing. The annular bushing and the annular position setting sleeve are mounted for raising or lowering relative to the main body of the molding tool over a predetermined range. The annular bushing is resiliently urged downwardly by a relatively weak spring means disposed between it and the main body, while the annular position setting sleeve is resiliently urged downwardly by a relatively strong spring means interposed between it and the main body of the molding tool.

In a normal state (that is, a state before the liner material is molded by insertion of the lower end of the molding tool into the closure shell), the lower end of the annular bushing is resiliently urged downwardly by the relatively weak spring means so as to project downwardly beyond the lower end of the center punch and the lower end of the annular position setting sleeve. Accordingly, when either the molding tool or the anvil is lowered or elevated toward one other so as to insert the molding tool into the closure shell and mold the liner material therein, the lower end of the annular bushing is received in the shell prior to the receipt of the lower end of the center punch and the lower end of the annular position setting sleeve. As the center punch press descends, it tends to spread the liner material radially outwardly of the inside of the top panel of the shell. One disadvantage associated with the above described system is that if the radially outward spreading of the liner material occurs before the lower end of the annular position setting sleeve is fully inserted into the closure shell, a portion of the liner material will extend below the lower end of the annular position setting sleeve. Even after the position setting sleeve is fully lowered, a portion of the liner material will generally flow beneath the locating sleeve. In any event, liner material which escapes beneath the position setting sleeve is undesirable because it is wasteful and causes a liner of non-uniform shape to be formed.

In order to minimize the required amount of the liner material and produce a liner of uniform appearance, it is important that the liner material to be molded should be restrained at the peripheral edge portion of the inside of the top panel of the closure shell so that the material will not spread radially outwardly therefrom.

DISCLOSURE OF INVENTION

The present invention provides a molding device which will accurately shape and form a liner even when a greater portion of the liner material is positioned annularly on the peripheral edge portion of the inside of the top panel of a closure shell.

The molding device of the present invention utilizes an annular bushing which is mounted for movement relative to the main body of a molding tool over a predetermined range and which is adapted to be urged downwardly by a resilient means and to define a plurality of extrusion flow passages to permit liner material to flow radially outwardly when the center punch is in a lowered position.

According to the present invention, there is provided a molding device for forming a liner on the inside surface of the top panel of a container closure shell where the device has a support surface adapted to support an inverted closure shell having a liner material on the inside surface of its top panel. A molding tool is disposed above the support surface and includes a main body and a center punch fixed to a lower end portion of the main body. The lower surface of the tool is positioned opposite to a central portion of the inside top panel surface of the shell on the support surface.

An annular bushing is positioned externally of the center punch and an elevator mechanism is included for elevating or lowering either of the main body of the molding tool or the support surface relative to the other. The annular bushing is mounted for movement relative to the main body of the molding tool over a predetermined range and has a lower end portion defining a plurality of flow passages. The flow passages may be provided as radially extending grooves on the bottom surface of the annular bushing or as radially extending bores through the lower end surface of the annular bushing.

The lower end surface of the annular bushing is adapted to be lowered into a position opposite to a central portion of the inside surface of a closure shell before the center punch reaches its lower position. In its lowered positioned, the annular bushing defines a mold cavity between it and the inside surface of the closure so that the liner material is pressed into the flow passages as the center punch is moved into the lowered position. When the lower end of the annular bushing has a bevelled surface, the liner formed has a relatively thin circular central web portion and a relatively thick outer ring portion. If it is desired to achieve an outer ring portion of varying configurations, the lower end surface of the annular bushing may alternatively include an appropriately shaped annular recess.

The molding device further includes resilient means for urging the annular bushing downwardly relative to the main body of the molding tool.

A method of forming a liner on an inside surface of an inverted closure shell having a liner material such as plastisol thereon comprises positioning an annular bushing having a lower end portion defining a plurality of flow passages so that the lower end portion is opposite a central portion of the inside of the closure shell, thereby defining a mold cavity in fluid communication with the flow passages. The liner material is pressed into the flow passages and the mold cavity by positioning a center punch concentrically disposed within the annular bushing opposite a central portion of the inside surface of a closure shell.

DETAILED DESCRIPTION OF THE INVENTION

Figure 1:
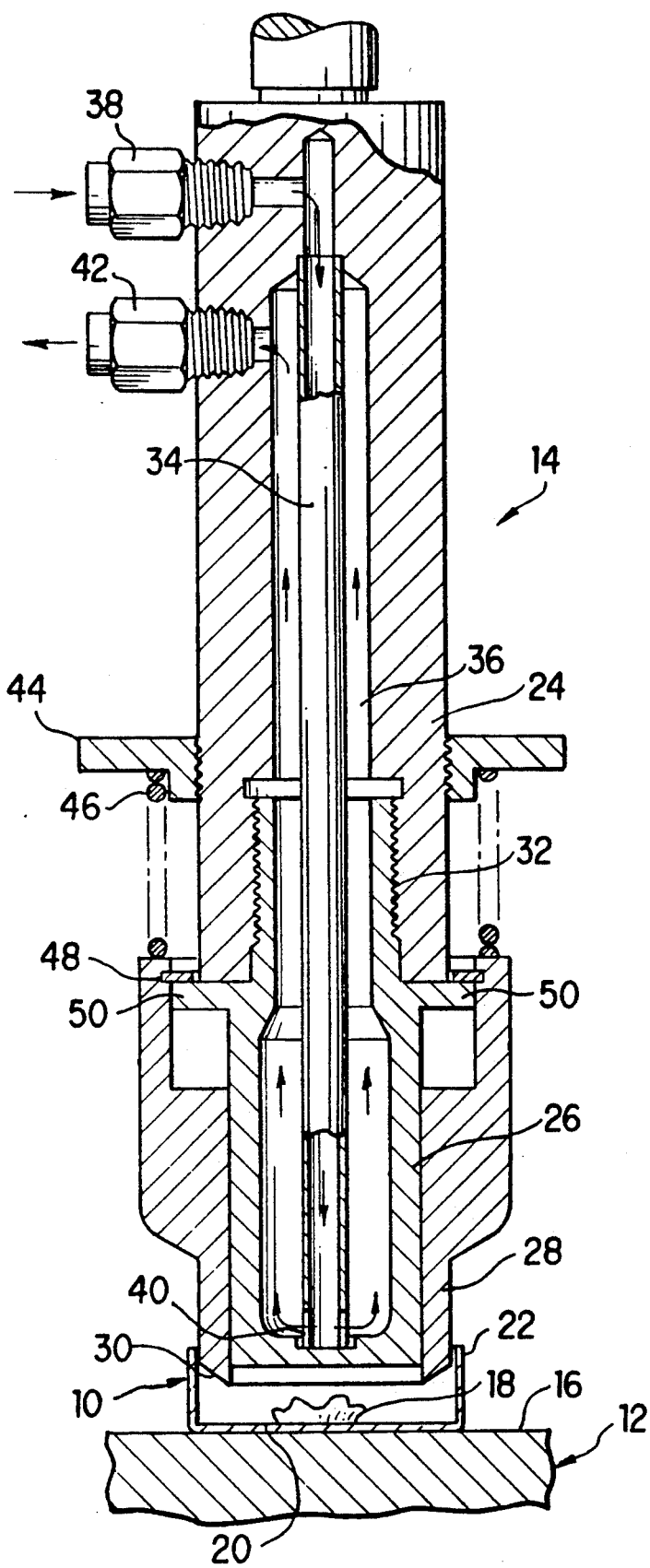
FIG. 1 is a partial sectional view of a molding device constructed in accordance with the invention.

Referring to FIG. 1, there is illustrated a molding device according to the invention having an anvil 12 and a molding tool generally shown at 14 and disposed above the anvil 12. The anvil 12 has a substantially flat top surface 16. An inverted closure shell 10 (that is, the inside of its top panel being turned upside) having a liner material 18 supplied to the inside of the top panel is conveyed to the top surface 16 of the anvil 12 by a suitable conveyor mechanism (not shown) and set in place.

The closure shell 10 may be of any suitable shape. For example, it may be fabricated from a metal plate such as an aluminum-base alloy plate, a tin plate or a chromate-treated steel sheet into such a shape that it has a circular top panel 20 and a cylindrical skirt 22 extending from the peripheral edge of the top panel 20. The liner material 18 which is to be molded and which has been supplied to the inside of the top panel 20 of the shell 10 may be of any desired shape. In order to ensure that a greater part of the liner material is positioned annularly in a uniform manner on the peripheral edge portion of the inside of the top panel 20, liner material 18 should be deposited as close as possible to the center of top panel 20. Where the diameter of the closure is very large, it may be desirable to extrude 18 liner material in annular form so that it is concentrically arranged on the surface of top panel 20.

The molding tool 14 has a main body 24, a center punch 26, and an annular bushing 28. Annular bushing 28 also serves as a position setting sleeve so that an additional concentrically arranged member is obviated. The center punch 26 is fixed to the main body 24 by threads 32 contained on the lower end of the main body 24. An introduction passage 34 and a discharge passage 36 are included in the main body 24 and the center punch for circulation of a suitable cooling fluid (or heating fluid) such as water. Preferably these passages are constructed such that a cooling fluid (or heating fluid) is introduced into the introduction passage 34 through an inlet portion 38 in the direction of the arrow. The fluid will flow into the discharge passage 36 through a hole 40 provided at the lower end of the introduction passage 34, and finally will be discharged from an outlet portion 42.

The annular bushing 28 is disposed externally of the center punch 26 so that it can be raised and lowered over a predetermined range. A spring means 46 consisting of a compression coil spring is interposed between the upper end of the annular bushing 28 and the lower surface of an annular member 44 fixed to the main body 24 so that the annular bushing 28 is resiliently urged downwardly relative to the main body 24 by the resilient action of the spring means 46.

The downward movement of the bushing 28 is restricted by a holding ring 48 fixed to the inside of the upper end portion of bushing 28 abutting against the top surfaces of a plurality of radially projecting circumferentially spaced portions 50 formed on the upper end portion of the center punch 26.

Figure 2:
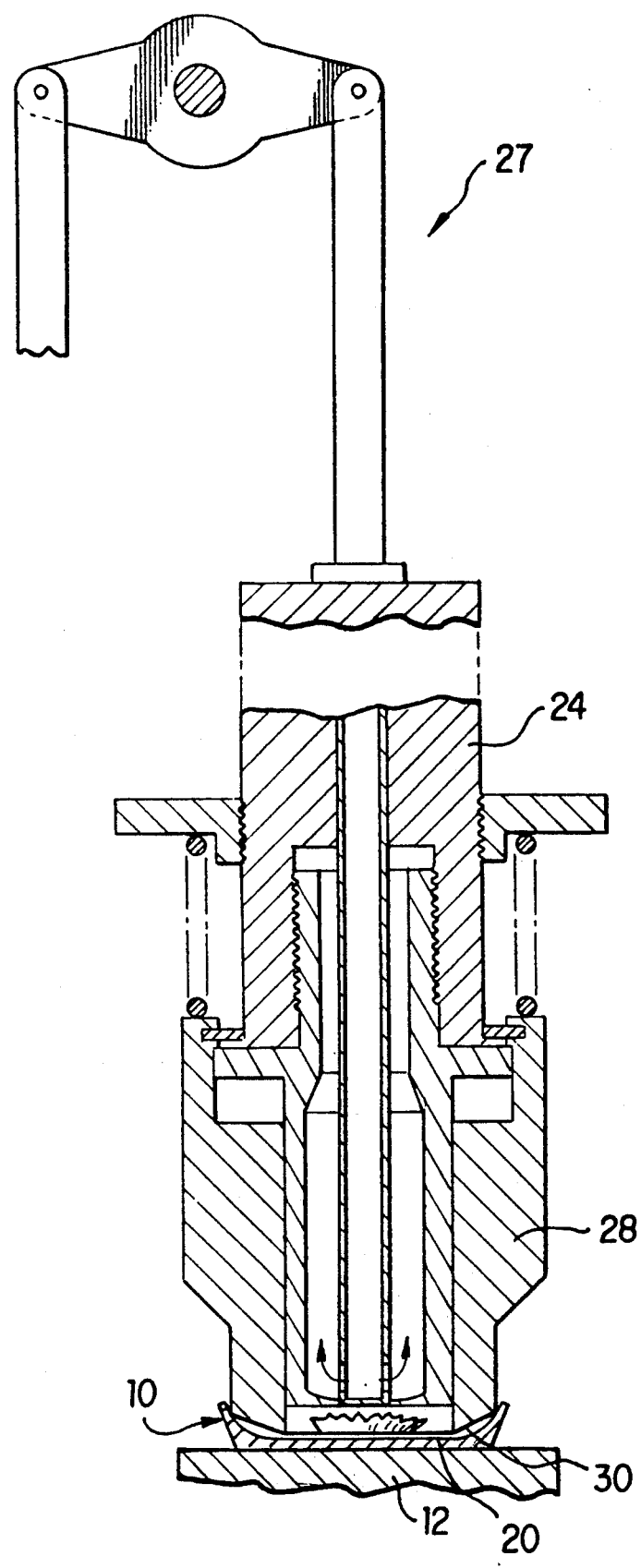
FIG. 2 is a partial sectional view showing the annular bushing in a lowered, mold cavity forming position.

In addition to the anvil 12 and the molding tool 14 described above, the molding device of the invention further includes an elevator mechanism as shown in FIG. 2 of any suitable known form for raising or lowering the main body 24 toward and away from the anvil 12. In the alternative, elevator means could be connected to the anvil 12 to provide relative movement of the anvil and main body 24 towards and away from each other.

When the lower end of the molding tool 14 is to be inserted into the container shell 10 by operating the elevator mechanism (not shown) to lower the main body 24 of the molding tool 14 or raise the anvil 12, the annular bushing 28 is held at its lowered position with respect to the main body 24 by the force of the spring member 46. Preferably, the lower end of the annular bushing 28 is positioned slightly below the lower end of the center punch 26.

Referring to FIG. 2, when elevator mechanism 27 is actuated to move the main body 24 and tool 14 relatively towards the anvil 12, the lower end surface 30 of the annular bushing 28 will initially abut against the inside surface of the top panel 20. This positioning of the annular bushing 28 centers the closure shell 10 on the anvil 12 if it is not accurately positioned with respect to the molding tool 14.

Figure 3:
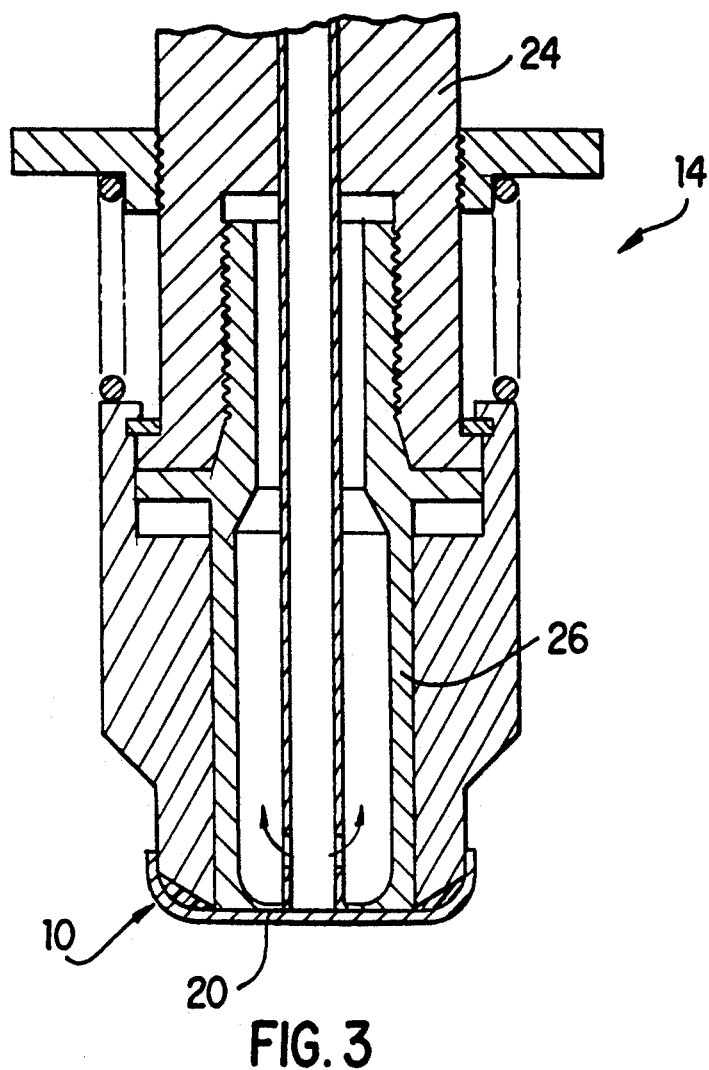
FIG. 3 is a partial sectional view showing the center punch in a lowered position.
Figure 4:
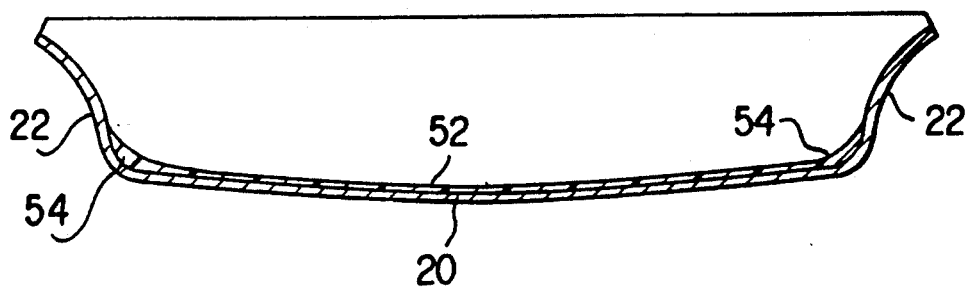
FIG. 4 is a diametric cross sectional view of a closure having a liner formed therein in accordance with the present invention.

Referring to FIG. 3, further relative movement of the main body and molding tool towards the anvil will bring the lower end of the center punch 26 into contact with the inside surface of the top panel 20 of the shell 10. The lower end of the center punch 26 contacts the liner material at the central portion of the top panel 20 and spreads it radially outwardly. At this point, the relative movement of the main body 24 and the molding tool 14 towards the anvil ceases. After the parts have reached the position shown in FIG. 3, a liner in the form of a thin disk with an annular ring projecting from the periphery of the surface of top panel 20 is formed. As shown in FIG. 4, the liner 50 has a relatively thin central portion 52 covering the substantially planar surface of top panel 20 and a thicker peripheral portion in the form of an annular ring 54 engaging the side wall or skirt 22.

Figure 5:
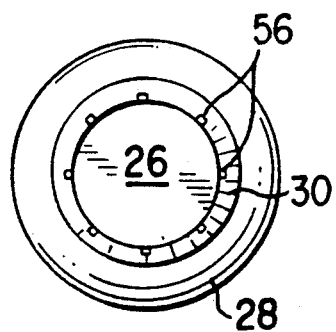
FIG. 5 is a bottom view of the lower surface of the annular bushing showing a plurality of radially extending grooves in accordance with one embodiment of the present invention.

As stated above, when the lower end of the molding tool 14 is initially inserted into the shell 10, the annular bushing 28 is held at a lowered position with respect to the main body 24, and the lower end of the annular bushing 28 is positioned below the lower end of the center punch 26. The lower end of the annular bushing 28 thus limits any radially outward spreading of the liner material 18, thereby avoiding the waste of liner material associated with prior art systems in which liner material escapes beneath the annular bushing to be stopped only by an additional outer sleeve. As shown in FIG. 5, the lower end surface 30 of annular bushing 28 may be bevelled to define a mold recess for receiving the material spread by center punch 26. The mold recess is formed between the lower end surface 30 and top panel 20, as shown in FIG. 3.

In order to permit the liner material to reach the mold recess when annular bushing 28 reaches the position shown in FIG. 3, a plurality of radial flow passages 56 are formed in bevelled surface 30. These passages permit liner material to be pressed into the mold recess and minimize the amount of pressure which must be exerted by center punch 26. Thus, the annular bushing 28 may be moved into a mold recess defining position shown in FIG. 3, so that the inner peripheral surface of the annular bushing contacts the surface of top panel 20 or is in closely spaced relation therewith, before center punch 26 presses against the liner material 18.

After the liner material 18 has been molded as required by the procedure described hereinabove with reference to FIGS. 1 to 5, the main body 24 of the molding tool 14 is moved relative away from the anvil 12 by the elevator mechanism, thereby moving the lower end of the molding tool 14 away from the shell 10. The main body 24 of the molding tool 14 is sufficiently moved away from the anvil 12 to move the lower end of the molding tool 14 completely out of contact with the inside of the shell 10. Then, the closure shell 10 is carried away from the top surface 16 of the anvil 12.

In contrast to the molding device of the present invention, in the prior art molding devices, the lower end of the molding tool is initially inserted into the shell, the annular bushing is held at its lowest position with respect to the main body of the molding tool and the lower end of the annular bushing projects downwardly beyond the lower end of the center punch and the lower end of an annular position setting sleeve. For this reason, before the lower end of the sleeve and the lower end of the center punch contact the inside surface of the top panel of the closure shell, the lower end of the annular bushing tends to press against the liner material to cause it to spread radially outwardly and inwardly away from the desired position.

A method of forming a liner on an inside surface of an inverted closure shell having a liner material thereon comprises positioning annular bushing 28 so that the lower end surface is opposite a central portion of the inside of the closure shell 10, thereby defining a mold cavity in fluid communication with the flow passages, pressing the liner material into the flow passages and the mold cavity by positioning a center punch concentrically disposed within the annular bushing opposite a central portion of the inside surface of a closure shell.

In the illustrated embodiment of the molding device of this invention, the molding tool 14 omits the annular position setting sleeve of the prior art since the construction of annular bushing 28 insures that the shell 10 is accurately placed at a predetermined position on the anvil, and the peripheral surface of the annular bushing 28 contacts the inner circumferential surface of the skirt 22 of the shell 10 very closely to prevent the liner material 18 from flowing radially outwardly and further upwardly along the inner circumferential surface of the skirt 22 of the shell 10. If it is not desired to form a liner which contacts the inner circumferential surface of the skirt 22, the lower end surface 30 of annular bushing 28 may be provided with an annular recess instead of a bevelled contour so that the liner material forms an annular ring spaced therefrom.

While the present invention has been described in detail hereinabove with reference to one embodiment of the molding device of the invention shown in the attached drawings, it should be understood that the invention is in no way limited to such a specific embodiment, and various changes and modifications are possible without departing from the spirit and scope of the invention.

For example, in the illustrated embodiment, the flow passages 58 are shown as grooves in bevelled surface 56 that extend linearly away from the central axis of the annular bushing 28. Other passage configurations, such as radially curved grooves or radial bores are also possible.

What is claimed is:

1. A molding device for forming a liner on an inside surface of an inverted closure shell having a liner material thereon, comprising:
    a support surface for supporting an inverted closure shell having a base and a sidewall;
    a main body having a first lower end portion;
    a center punch having a lower surface fixed to the first lower end portion with the lower surface of the center punch adapted to be positioned opposite to a central portion of the inside surface of a closure shell supported on the supporting surface;
    an elevator mechanism for moving the main body with respect to the supporting surface; and
    an annular bushing positioned externally of the center punch, said annular bushing being movable with respect to the main body and having a second lower end portion defining a mold cavity and a plurality of flow passages, wherein said second lower end portion of said annular bushing includes an inner diameter for contacting the base of the closure shell and an outer diameter for contacting the sidewall of the closure shell and preventing the escape of liner material from the mold cavity, said flow passages extending through the inner diameter of the second lower end portion, but not extending to the outer diameter of the second lower end portion.

2. A molding device according to claim 1, wherein said flow passages are radially extending.

3. A molding device according to claim 1, wherein said second lower end portion is a bottom surface of said annular bushing and said flow passages are formed in said bottom surface.

4. A molding device according to claim 3, wherein said flow passages are radially extending grooves.

5. A molding device according to claim 1, wherein said second lower end portion includes a bevelled surface.

6. A molding device according to claim 5, wherein said flow passages are radially extending grooves formed on said bevelled lower end surface.

7. A molding device according to claim 1, further comprising a first resilient means for urging the annular bushing downwardly relative to said main body.

8. A closure liner punch for forming a liner on an inside surface of an inverted closure shell having a liner material thereon, comprising:

a center punch having a lower surface and adapted to be positioned opposite to a central portion of the inside surface of an inverted closure shell having a base, and a sidewall, said center punch being movable between upper and lower positions; and an annular bushing concentrically positioned externally of the center punch, said annular bushing being movable with respect to said center punch and having a lower end portion which includes an inner diameter for contacting the base of the closure shell, an outer diameter for contacting the sidewall of the closure shell and preventing the escape of liner material, a mold cavity positioned between the inner and outer diameters, and a plurality of flow passages extending through the inner diameter of the lower end portion, but not extending to the outer diameter of the lower end portion.

9. A molding device according to claim 8, wherein said flow passages are radially extending and wherein said lower end portion is adapted to be positioned opposite to a central portion of the inside surface of a closure shell before said center punch reaches its lower position so that the liner material is pressed into said flow passages as said center punch is moved into said lowered position.

10. A molding device according to claim 8, wherein said lower end portion is a bottom surface of said annular bushing.

11. A molding device according to claim 10, wherein the bottom surface of said annular bushing and the surface of the closure shell define a mold cavity and wherein said mold cavity is in fluid communication with said flow passages.

12. A molding device according to claim 10, wherein said flow passages are radially extending grooves.

13. A molding device according to claim 8, wherein lower end portion is a bevelled lower end surface of said annular bushing.

14. A molding device according to claim 13, wherein said flow passages are radially extending grooves formed on said bevelled lower end surface.

15. The molding device of claim 1 wherein the main body comprises passages for fluid circulation located therein.

16. The closure liner punch of claim 8 wherein the center punch includes a passages for fluid circulation located therein.

* * * * *